J. C. HILL.
LUBRICATOR.
APPLICATION FILED APR. 17, 1908.

902,583.

Patented Nov. 3, 1908.

3 SHEETS—SHEET 2.

Attest:
John Enders.
Henry Mor.

Inventor:
John C. Hill,
by Robert Burns
Attorney.

J. C. HILL.
LUBRICATOR.
APPLICATION FILED APR. 17, 1908.
902,583.
Patented Nov. 3, 1908.
3 SHEETS—SHEET 3.
Fig. 4.
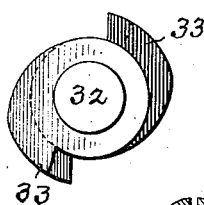
Fig. 5.
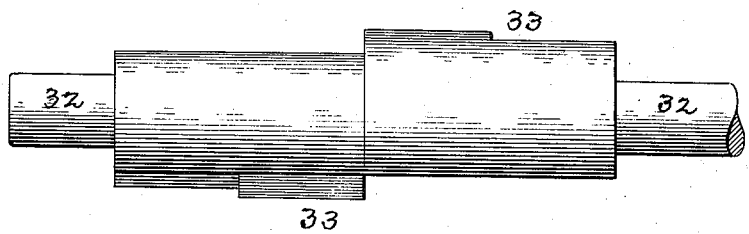
Fig. 6.
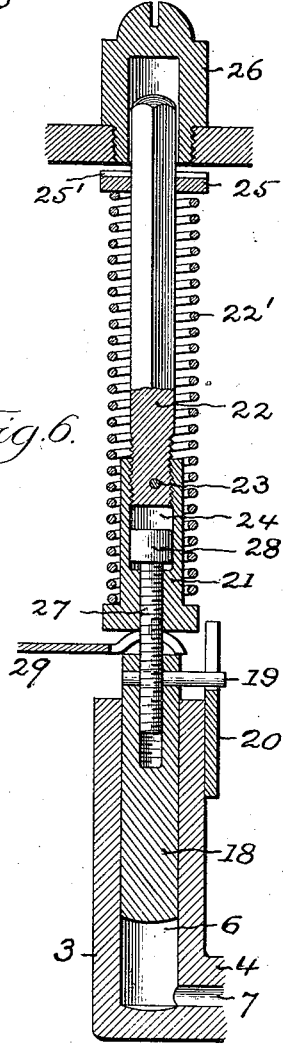
Fig. 7.
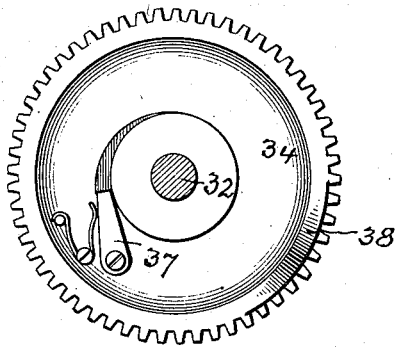
Fig. 8.
Fig. 9.
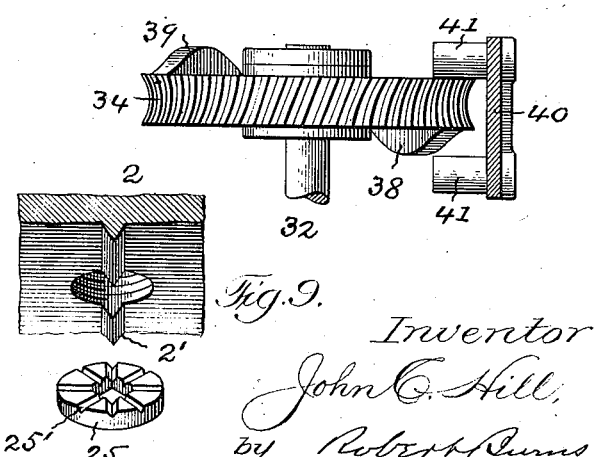
Attest:
John Enders
Henry Mor
Inventor:
John C. Hill,
by Robert Burns
Attorney

UNITED STATES PATENT OFFICE.

JOHN C. HILL, OF CHICAGO, ILLINOIS.

LUBRICATOR.

No. 902,583.   Specification of Letters Patent.   Patented Nov. 3, 1908.

Application filed April 17, 1908. Serial No. 427,620.

*To all whom it may concern:*

Be it known that I, JOHN C. HILL, a citizen of the United States of America, and a resident of Chicago, in the county of Cook and State of Illinois, have invented certain new and useful Improvements in Lubricators, of which the following is a specification.

This invention relates to the type of multiple force feed lubricators which constitute the subject matter of my prior application for Letters Patent, Serial No. 302,839, filed February 26, 1906, and has for its object to provide a simple and efficient construction and combination of parts whereby a series of separately regulated and individual discharges of the lubricant is effected in a ready manner without undue variation in the power required to operate the mechanism, all as will hereinafter more fully appear.

Figure 1:
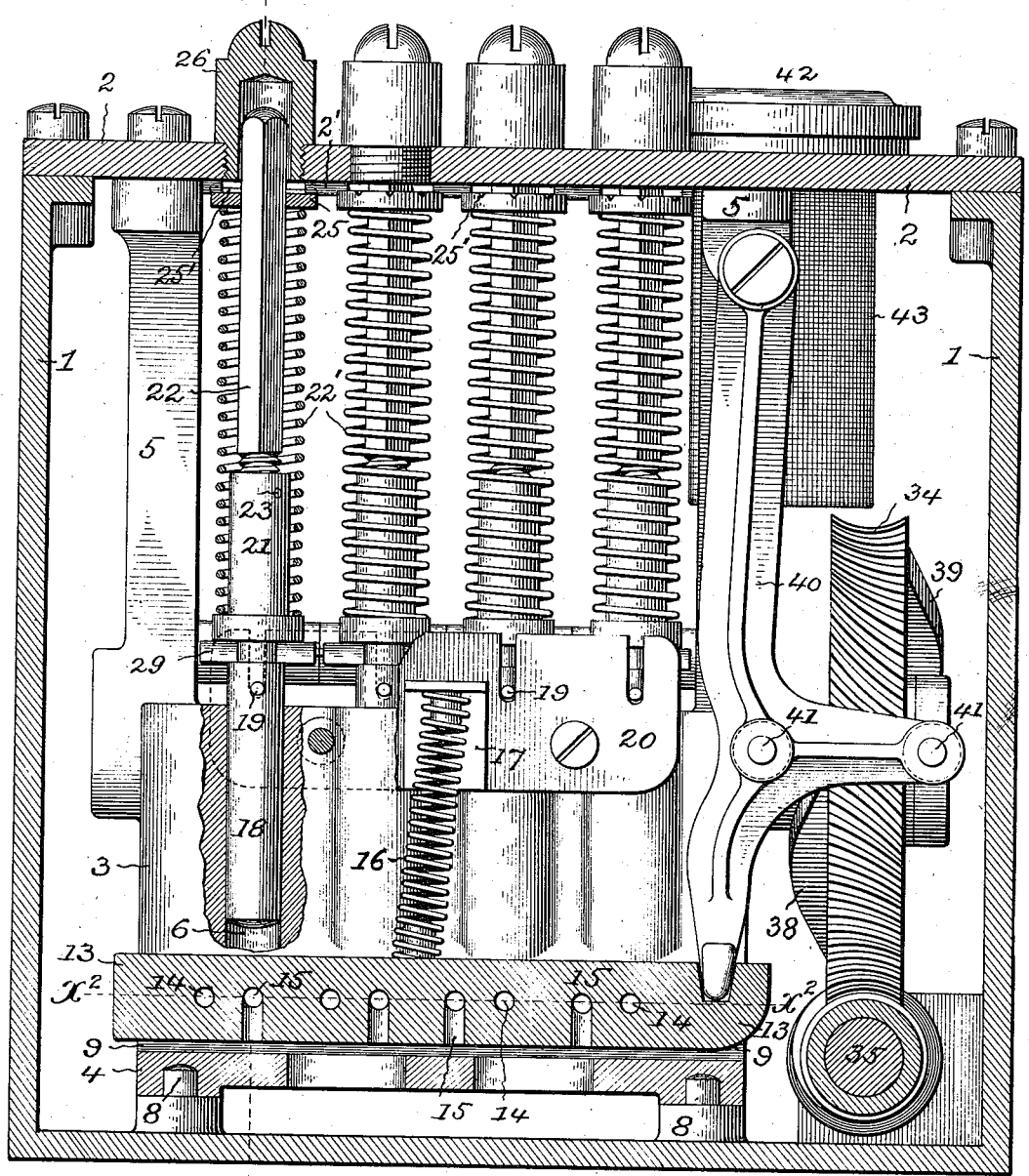
Figure 2:
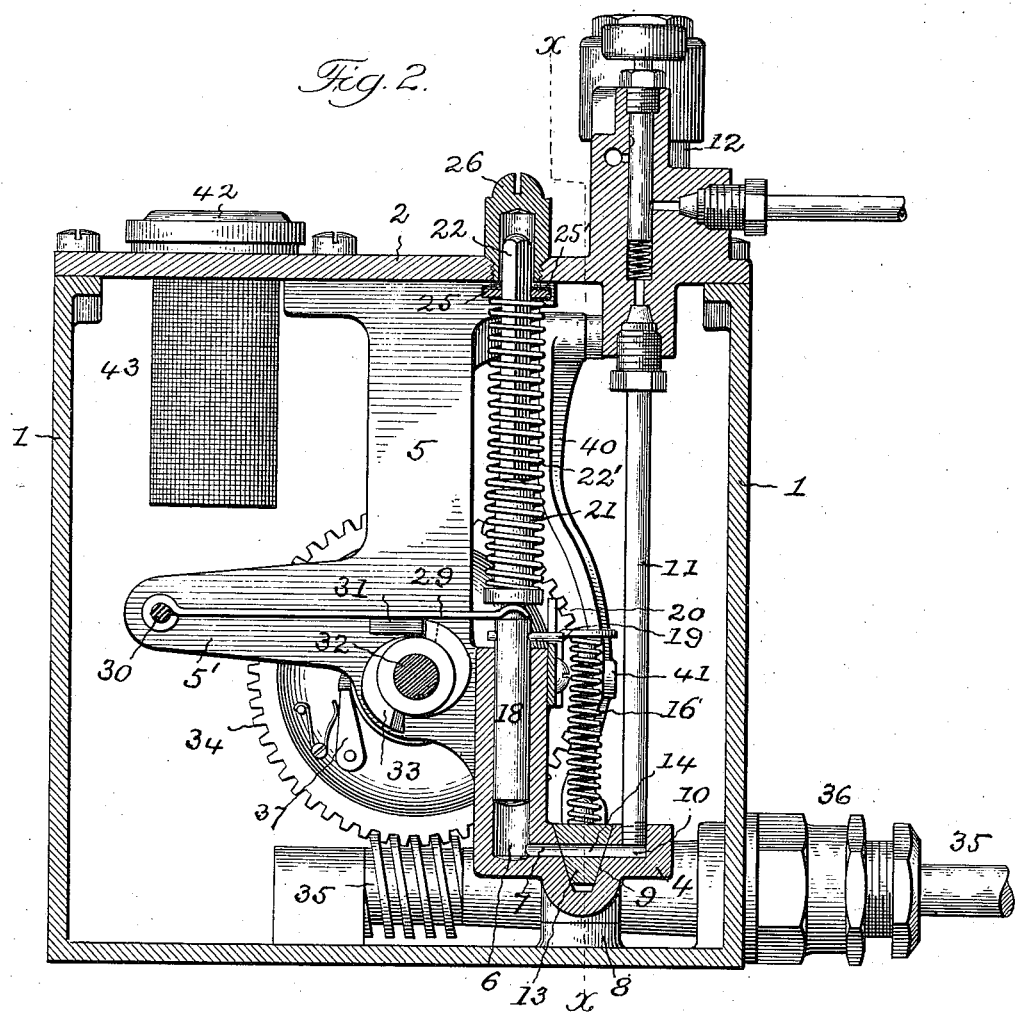
Figure 3:
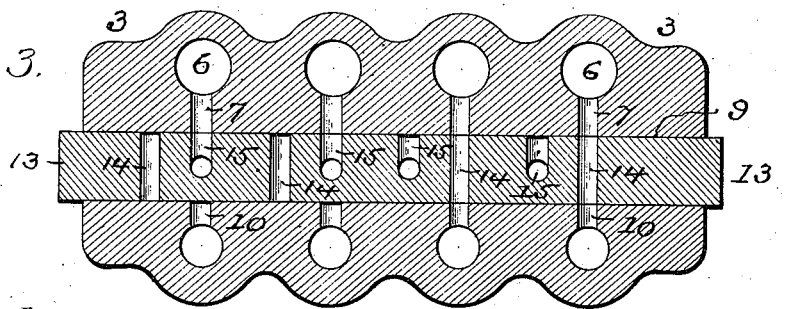

In the accompanying drawings illustrative of the present invention: Figure 1, is a vertical longitudinal section on line $x$—$x$ Fig. 2. Fig. 2, is a vertical transverse section on line $x'$—$x'$ Fig. 1. Fig. 3, is a detail horizontal section on line $x^2$—$x^2$ Fig. 1. Fig. 4, is a detail end elevation of the operating cam of the pump plungers. Fig. 5, is a detail side elevation of the same. Fig. 6, is an enlarged detail section on line $x'$—$x'$ Fig. 1 of a pump plunger and its accessories. Fig. 7, is a detail sectional elevation of the worm wheel of the mechanism. Fig. 8, is a detail plan of the same. Fig. 9, is a detached fragmentary perspective view of the locking collar and accessories for the guide stems of the pump plungers.

Similar numerals of reference indicate like parts in the several views.

Referring to the drawings, 1 represents an open top casing or housing forming a containing chamber for the lubricant and in which the pumping mechanism hereinafter described is arranged in an immersed condition, as usual in the present type, of force feed lubricators.

2, is a removable cover forming a closure for the open top of the casing 1 aforesaid.

3, is the pump casing which in the present construction is provided with a lateral ledge 4 at its lower end and with upwardly extended members 5 at its respective ends by means of which said casing is secured to and supported by the cover 2 in a depending manner inside the casing 1; such members in addition provide bearings for the operating cam shaft by which the pump plungers are moved in one direction and pivotal attachment for the intermediate lifter arms by which the movement of the cams is imparted to the pump plungers as hereinafter more fully set forth.

The pump casing 3 is formed with a longitudinal series of pump cylinders or chambers 6, in parallel arrangement, with inlet-outlet ports 7 arranged transversely at the bottom of the pump chambers as shown.

8 are stationary studs on the bottom of the main casing 1 adapted to engage in corresponding recesses in the bottom of the pump casing 3, to hold the same in place within said main casing.

9, is an open top longitudinal channel formed in the aforesaid ledge 4 with its opposed walls adapted to constitute a seat for the single controlling slide valve hereinafter described. The inlet-outlet ports 7 aforesaid open through the inner wall of said channel, while a series of outlet ports or passages 10, alined with the ports 7 aforesaid, open through the outer wall of said channel, and are connected by suitable pipe connections 11, preferably with a sight feed attachment 12, and from thence to the respective bearings or parts to be lubricated.

The sight feed attachment above referred to may be of any usual type, such as forms the subject matter of my prior patent No. 853695 of May 14, 1907, or the improved type of the same which forms the subject matter of my companion application Serial No. 427,619 filed April 17, 1908.

13 is the controlling valve above referred to and which has its seat or bearing upon the opposed walls of the longitudinal channel 9, and receives intermittent reciprocation from mechanism hereinafter described. Such valve is formed with two series of ports or passages, one series 14 of which extend transversely through the valve and are adapted to register the inlet-outlet ports 7 of the pump casing with the outlet ports 10 above described, while the other series 15 of such ports are of an angular quarter turn form, alternating with the other series of ports, and opening down through the bottom of the valve 13 to register the inlet-outlet ports 7 of the pump casing, with an open space at the bottom of the channel 9 which in turn communicates with the interior of the main casing 1, as shown in Fig. 1.

16 is a central compression spring arranged between the top of the valve 13 and a bracket piece 17 on the pump casing, for holding said valve to its seat while permitting a free longitudinal movement of the same.

18 are a series of pump plungers individual to the pump chambers 6 and provided with lateral guide pins 19 engaging a guide comb 20 on the pump casing to prevent a turning movement of the plungers during the operation of the apparatus, or in the operation of adjusting the stroke of the plungers, hereinafter more particularly described.

21 are a series of sleeves formed with collars near their lower ends upon which bear the hereinafter described series of springs which impart downward movement to the pump plungers; each of said sleeves is formed with a vertical bore having a reduced screw-threaded lower portion for engagement with the screw-threaded shank of the hereinafter described adjusting connection between said sleeve and a pump plunger. The upper end of said bore is also screw-threaded for the reception of the lower end of a guide stem hereinafter described.

22 are a series of the guide stems above referred to and which have their lower ends screw-threaded to screw into the upper ends of the vertical bores of the sleeves 21, and are fixedly secured therein by cross pins 23, or other usual provision adapted to afford a rigid and permanent connection between a sleeve 21 and a guide stem 22. Arranged as above the lower end of a guide stem and the offset between the vertical bore and its reduced lower portion aforesaid provides an intermediate chamber 24 in which the headed upper end of the above referred to adjusting connection has limited movement as hereinafter more fully set forth.

The upper ends of the series of guide stems 22 are of a non-circular form for ready engagement with a key or wrench by which they are turned in effecting a change in the stroke of a particular pump plunger, as hereinafter more fully set forth.

25 are guide collars arranged on the under side of the casing cover 2, and having a non-circular orifice engaging the upper ends of the guide stems 22 aforesaid. In the present construction, said collars are formed with series of radial depressions 25' in the face adjacent to the cover 2 and adapted to engage a corresponding rib 2' on the under side of said cover to require some manual stress to cause an independent turning movement of a collar, and in consequence will tend to effectively maintain the collars and the guide stems engaged therewith at any adjustment to which they had been manually turned.

22' are a series of springs surrounding the guide stems 22 and arranged between the sleeves 21 and the guide collars 25 with a normal tendency to depress the pump plungers and parts moving therewith.

26 are hollow cap nuts screwing through the casing cover 2 to form housings for the upper ends of the guide stems 22; such cap nuts are intended to be removed when access is desired to the upper ends of the guide stems in effecting the before mentioned adjustment of the stroke of the pump plungers 27 is the adjusting connection above referred to, and which consists of a screw-threaded shank having turning engagement in the reduced screw-threaded orifice of the sleeve 21 aforesaid, with its lower end screwed into a pump plunger and permanently secured therein by a cross pin, preferably a guide pin 19 before described. Such shank at its upper end has an enlarged head 28 arranged in the aforesaid intermediate chamber 24 and capable of limited vertical adjustment therein. With the described arrangement of parts each sleeve 21 can be screwed up or down upon the screw-threaded shank of the connection 27 a maximum distance equal to the full stroke of the pump plungers, so as to receive the full lift of the cams by which the pump plungers are raised, or any desired portion of such lift, and thus regulate the quantity of lubricant pumped at each stroke of any particular pump plunger. The range of adjustment above set forth is controlled by the movement of the head 28 in the intermediate chamber 24 and its abutment against one or the other end of said chamber.

29 are a series of intermediate lifter arms pivoted at one end to a longitudinal shaft 30, carried by bracket extensions 5' of the members 5 before described. Such lifter arms carry bearing shoes 31 midway their length for engagement with the operating cams hereinafter described, and with forked and rounded free ends for engagement beneath the series of sleeves 21 aforesaid.

32 is the longitudinally operating cam shaft of the mechanism, journaled in the members 5 of the pump casing, with its cam portion 33 common to the series of lifter arms 29 aforesaid.

34 is a worm wheel carried by the cam shaft 32 and operatively engaged by an endless screw carried on an operating shaft 35 which extends outside the main casing 1, through a suitable gland 36, and connected to a suitable power source.

37 is a pawl and ratchet connection between the worm wheel 34 and the cam shaft 32, adapted to prevent an accidental reverse rotation being imparted to the cam shaft, with a consequent destruction of the operating mechanisms of the pump plungers.

38 and 39 are cam projections or inclines arranged in opposed diametric relation, and on opposite sides of the worm wheel 34 as shown.

40 is a vertical lever fulcrumed at its upper end to one of the members 5 of the pump casing, with its lower end in operative engagement with the slide valve 13, as shown in Fig. 1.

41 are a pair of tappets carried by the lever 40 intermediate of its height, and arranged to straddle the worm wheel 34, to be alternately engaged by the cam projections 38 and 39, to impart intermittent movement to the lever 40, and intermittent reciprocation to the slide valve 13, in a continued operation of the apparatus.

42 is the filling orifice of the apparatus, and 43 the usual wire gauze strainer therefor.

A material feature of the present invention consists in the formation of the cam portion 33 of the operating cam shaft 32 in two portions arranged in circumferential serial relation with one portion a half a circle in advance of the other, as shown more particularly in Figs. 4 and 5; and in the combination with such cam formation of corresponding serial arrangement of groups of the series of ports or passages 14 and 15 of the slide valve 13. So that in a multiple feed lubricator having four pump plungers and four individual discharges, as shown in the drawing, two pair of ports or passages 14 and 15 will constitute one group, and a similar number of such ports or passages the other group, and which groups have the reversed arrangement shown in Figs. 1 and 3. As so arranged, and with the valve 13 in the position shown in Fig. 1, the ports of the group to the left will be in register with the two pump chambers to the left to admit the lubricant from the main casing 1 into such pump chambers; while at the same time the ports or passages of the other group to the right will be in register with the two pump chambers to the right to permit of the lubricant contained in said pump chambers being forced to the respective individual bearings to be lubricated. With the valve 13 in its other position, the ports above described as in active operation are moved into a dormant position, while the previously dormant ports are brought into their active positions to effect a reverse operation on the part of the pumping mechanism, to that above set forth.

The operation of the apparatus is as follows: With a continued rotation of the cam shaft 32, upward movement is communicated from the cam portions 33 thereof, and through the intermediate lifting arms 29, to the two groups of pump plungers alternately to lift them to their full height. During such lifting movement the particular group of pump chambers are in communication with the interior of the lubricator casing 1 so as to freely take the lubricant therefrom. As such group of pump plungers reach their raised position, the controlling slide valve 13, is shifted by its lever 40 and one or the other of the cam projections 38 and 39, to close communication of said group of pump chambers with the interior of the lubricator casing, and open said pump chambers to the outlet passages 10. The high part of the particular cam portion 33 then moves from beneath the lifting arms and the group of pump plungers are forcibly depressed by the springs 22' to discharge the lubricant from said pump chambers through said outlet passages 10 and to the point of use.

Simultaneously to the above operations, the reverse operations of the other group of pump plungers and accessories is taking place.

Having thus fully described my said invention what I claim as new and desire to secure by Letters Patent, is:

1. In a lubricator, the combination of a pump casing formed with a series of pump chambers having inlet-outlet passages at one end, a series of plungers in said pump chambers, a valve member formed with an inlet and an outlet passage for each of said pump chambers, and means for reciprocating said valve, the inlet and outlet passages of the valve being arranged in groups having a reversed relation.

2. In a lubricator, the combination of a pump casing formed with a series of pump chambers having inlet-outlet passages at one end, a series of plungers in said pump chambers, a valve member formed with an inlet and an outlet passage for each of said pump chambers, and means for reciprocating the plungers and the valve in timed relation, the inlet and the outlet passages of the valve being arranged in groups having a reversed relation.

3. In a lubricator, the combination of a pump casing formed with a series of pump chambers having inlet-outlet passages at one end, a series of plungers in said pump chambers, a valve member formed with an inlet and an outlet passage for each of said pump chambers, means for individually adjusting the stroke of said plungers, and means for reciprocating said valve, the inlet- and outlet passages of the valve being arranged in groups having a reversed relation.

4. In a lubricator, the combination of a pump casing formed with a series of pump chambers having inlet-outlet passages at one end, a series of plungers in said pump chambers, a valve member formed with an inlet and an outlet passage for each of said pump chambers, means for individually adjusting the stroke of said plungers, and means for reciprocating the plungers and the valve in timed relation, the inlet and outlet passages of the valve being arranged in groups having a reversed relation.

5. In a lubricator, the combination of a pump casing formed with a series of pump chambers having inlet-outlet passages at one end, a series of plungers in said pump chambers, an operating cam shaft having cam formations in circumferential spaced relation, a valve member formed with an inlet and an outlet passage for each of said pump chambers, and means for reciprocating said valve, the inlet and outlet passages of the valve being arranged in groups having a reversed relation.

6. In a lubricator, the combination of a pump casing formed with a series of pump chambers having inlet-outlet passages at one end, a series of plungers in said pump chambers, an operating cam shaft having cam formations in circumferential spaced relation, a valve member formed with an inlet and an outlet passage for each of said pump chambers, means for individually adjusting the stroke of said plungers and means for reciprocating said valve, the inlet and outlet passages of the valve being arranged in groups having a reversed relation.

7. In a lubricator, the combination of a pump casing formed with a series of pump chambers having inlet-outlet passages at one end, a series of plungers in said pump chambers, an operating cam shaft having cam formations in circumferential spaced relation and adapted to move the plungers in one direction, a series of springs for moving the plungers in the other direction, a valve member formed with an inlet and an outlet passage for each of said pump chambers, and means for reciprocating said valve, the inlet and outlet passages of the valve being arranged in groups having a reversed relation.

8. In a lubricator, the combination of a pump casing formed with a series of pump chambers having inlet-outlet passages at one end, a series of plungers in said pump chambers, an operating shaft having cam formations in circumferential spaced relation and adapted to move the plungers in one direction, a series of springs for moving the plungers in the other direction, means for individually adjusting the stroke of said plungers, a valve member formed with an inlet and an outlet passage for each of said pump chambers, and means for reciprocating said valve, the inlet and the outlet passages of the valve being arranged in groups having a reversed relation.

9. In a lubricator, the combination of a pump casing formed with a series of pump chambers having inlet-outlet passages at one end, a series of plungers in said pump chambers, an operating cam shaft having cam formations in circumferential spaced relation and adapted to move the plungers in one direction, a series of springs for moving the plungers in the other direction, a valve member formed with an inlet and an outlet passage for each of said pump chambers, and means intermediate of the cam shaft and the valve for reciprocating the valve in timed relation with the plungers, the inlet and outlet passages of the valve being arranged in groups having a reversed relation.

10. In a lubricator, the combination of a pump casing formed with a series of pump chambers having inlet-outlet passages at one end, a series of plungers in said pump chambers, an operating cam shaft having cam formations in circumferential spaced relation and adapted to move the plungers in one direction, a series of springs for moving the plungers in the other direction, means for individually adjusting the stroke of said plungers, a valve member formed with an inlet and an outlet passage for each of said pump chambers, and means intermediate of the cam shaft and the valve for reciprocating the valve in timed relation with the plungers, the inlet and outlet passages of the valve being arranged in groups having a reversed relation.

11. In a lubricator, the combination of a pump casing formed with a series of pump chambers having inlet-outlet passages at one end, a series of plungers in said pump chambers, a valve member formed with an inlet and an outlet passage for each of said pump chambers, means for reciprocating the plungers comprising in part intermediate lifting arms, sleeves adjustably connected to the plungers and engaged by the lifting arms, guide stems attached to said sleeves and adapted to effect individual adjustments of said sleeves, and means for reciprocating said valve.

12. In a lubricator, the combination of a pump cylinder, a plunger moving in the same, means for imparting movement to said plunger, and means for holding the plunger from rotation the same comprising a non-circular stem on the plunger, a collar having a non-circular orifice fitting said stem and provided with a series of radial depressions in one face, and a guide for said stem having a surface ridge for engagement with said depressions.

13. In a lubricator the combination of a main containing casing, a pump casing arranged in said main casing and formed with a series of pump chambers having inlet-outlet passages at one end, a series of plungers in said pump chambers, a valve member formed with an inlet and an outlet passage for each of said pump chambers, and means for reciprocating said valve, the inlet and outlet passages of the valve being arranged in groups having a reversed relation.

14. In a lubricator, the combination of a main containing casing, a pump casing arranged in said main casing and formed with a series of pump chambers having inlet-outlet passages at one end, a series of plungers in said pump chambers, a valve member formed with an inlet and an outlet passage for each of said pump chambers, and means for reciprocating the plungers and the valve in timed relation, the inlet and the outlet passages of the valve being arranged in groups having a reversed relation.

15. In a lubricator the combination of a main containing casing, a pump casing arranged in said main casing and formed with a series of pump chambers having inlet-outlet passages at one end, a series of plungers in said pump chambers, a valve member formed with an inlet and an outlet passage for each of said pump chambers, means for individually adjusting the stroke of said plungers, and means for reciprocating said valve, the inlet and outlet passages of the valve being arranged in groups having a reversed relation.

16. In a lubricator the combination of a main containing casing, a pump casing arranged in said main casing and formed with a series of pump chambers having inlet-outlet passages at one end, a series of plungers in said pump chambers, a valve member formed with an inlet and an outlet passage for each of said pump chambers, means for individually adjusting the stroke of said plungers, and means for reciprocating the plungers and the valve in timed relation, the inlet and outlet passages of the valve being arranged in groups having a reversed relation.

17. In a lubricator, the combination of a main containing casing, a pump casing arranged in said main casing and formed with a series of pump chambers having inlet-outlet passages at one end, a series of plungers in said pump chambers, an operating cam shaft having cam formations in circumferential spaced relation, a valve member formed with an inlet and an outlet passage for each of said pump chambers, and means for reciprocating said valve, the inlet and outlet passages of the valve being arranged in groups having a reversed relation.

18. In a lubricator, the combination of a main containing casing, a pump casing arranged in said main casing and formed with a series of pump chambers having inlet-outlet passages at one end, a series of plungers in said pump chambers, an operating cam shaft having cam formations in circumferential spaced relation, and adapted to move the plungers in one direction, a series of springs for moving the plungers in the other direction, a valve member formed with an inlet and an outlet passage for each of said pump chambers, and means for reciprocating said valve, the inlet and outlet passages of the valve being arranged in groups having a reversed relation.

19. In a lubricator, the combination of a main containing casing, a pump casing arranged in said main casing and formed with a series of pump chambers having inlet-outlet passages at one end, a series of plungers in said pump chambers, an operating cam shaft having cam formations in circumferential spaced relation and adapted to move the plungers in one direction, an operating spring for moving the plungers in the other direction, a valve member formed with an inlet and an outlet passage for each of said pump chambers, and means intermediate of the cam shaft and the valve for reciprocating the valve in timed relation with the plungers, the inlet and outlet passages of the valve being arranged in groups having a reversed relation.

20. In a lubricator the combination of a main containing casing, a pump casing arranged in said main casing and formed with a series of pump chambers having inlet-outlet passages at one end, a series of plungers in said pump chambers, a valve member formed with an inlet and an outlet passage for each of said pump chambers, means for reciprocating the plungers comprising in part intermediate lifting arms, sleeves adjustably connected to the plungers and engaged by the lifting arms, guide stems attached to said sleeves and adapted to effect individual adjustment of said sleeve, and means for reciprocating said valve.

21. In a lubricator, the combination of an open top containing casing, a removable cover therefor, a pump casing supported in the containing casing by vertical members connecting the pump casing with the removable cover, and fixed studs on the bottom of the containing casing engaging recesses in the bottom of the pump casing.

22. In a lubricator, the combination of a pump cylinder, a plunger moving in the same, means for imparting movement to said plunger, and means for holding the plunger from rotation the same comprising a non-circular stem on the plunger, a collar having a non-circular orifice fitting said stem and provided with a series of radial depressions in one face, a guide for said stems having a surface ridge for engagement with such depressions, and a hollow cap nut screwing into said guide to form a housing for the upper end of said guide stem.

23. In a lubricator, the combination of a pump cylinder, a plunger moving in the same, a cam shaft and intermediate arm for moving the plunger in one direction, a spring for moving the plunger in the other direction, and means for holding the plunger from rotation, the same comprising a non-circular stem on the plunger, a collar having a non-circular orifice fitting said stem and provided with a series of radial depressions in one face, and a guide for said stem having a surface ridge for engagement with said depressions.

24. In a lubricator, the combination of a pump cylinder, a plunger moving in the same, a cam shaft and intermediate arm for moving the plunger in one direction, a spring for moving the plunger in the other direction, and means for holding the plunger from rotation, the same comprising a non-circular stem on the plunger, a collar having a non-circular orifice fitting said stem and provided with a series of radial depressions in one face, a guide for said stems having a surface ridge for engagement with such depressions, and a hollow cap nut screwing into said guide to form a housing for the upper end of said guide stem.

Signed at Chicago, Illinois this 14th day of April 1908.

JOHN C. HILL.

Witnesses:
 ROBERT BURNS,
 HENRY MOE.